April 15, 1969 W. D. CAIN 3,438,271
ROTARY CAM AND SPRING LOADED FOLLOWER DEVICES AND
ARRANGEMENTS INCORPORATING SAME
Filed Jan. 13, 1967

INVENTOR
William Dennis Cain
BY
Baldwin Wight Diller & Brown
ATTORNEYS

United States Patent Office 3,438,271
Patented Apr. 15, 1969

3,438,271
ROTARY CAM AND SPRING LOADED FOLLOWER
DEVICES AND ARRANGEMENTS INCORPORATING SAME
William Dennis Cain, St. Albans, England, assignor to Marconi Instruments Limited, London, England, a British company
Filed Jan. 13, 1967, Ser. No. 609,018
Claims priority, application Great Britain, Jan. 19, 1966, 2,571/66
Int. Cl. F16h *35/18*
U.S. Cl. 74—10.6                                       7 Claims

ABSTRACT OF THE DISCLOSURE

The follower of a rotary cam and follower mechanism is urged into contact with the cam by a spring which is connected to a spring anchorage which moves in response to rotation of the cam so that, as rotation of the cam increases the cam radius of the point of engagement with the follower, the spring force is prevented from increasing in proportion to movement of the follower by the cam. The mechanism is disclosed as for operating, e.g., a precision electronic tuning device.

---

This invention relates to rotary cam and spring loaded follower devices and arrangements incorporating the same.

Figure 1:
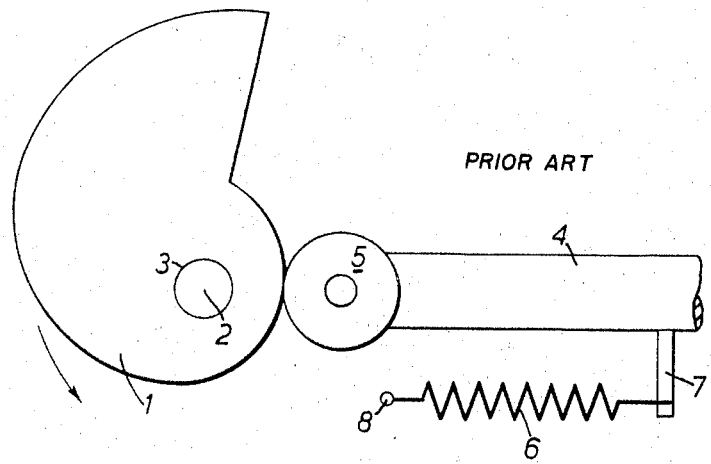
Figure 2:
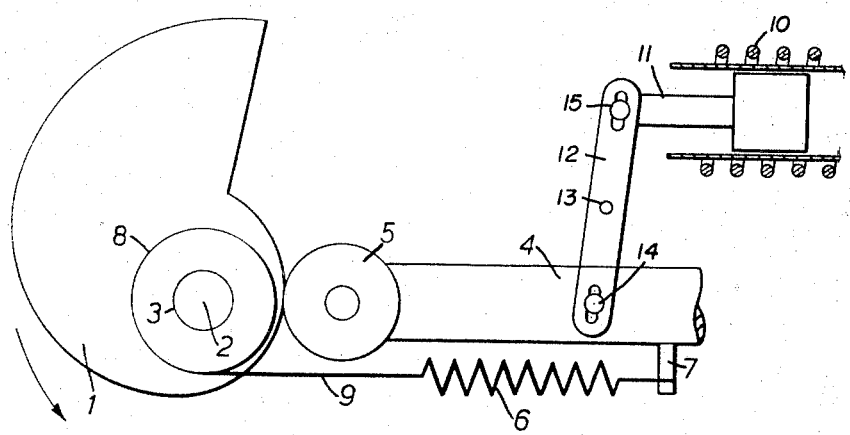

The invention is illustrated in and explained in connection with the accompanying drawing in which FIGURE 1 shows in side elevation a typical known rotary cam and spring loaded follower device and FIGURE 2 shows in side elevation one form of rotary cam and spring loaded follower device in accordance with the present invention.

Referring to FIGURE 1 the known rotary cam and spring loaded follower device consists of a cam 1 profiled in accordance with any required law and mounted to rotate about its centre of rotation 2. A shaft 3 is provided to rotate the cam 1. The cam follower is a roller 5 on a shaft 4 which is guided to move endwise (by means not shown). A spring 6 is tensioned between a peg 7 carried by the shaft 4 and a fixed point 8 so as to urge the cam follower towards the surface of the cam 1.

The known arrangement described above suffers from the defect that the spring provides a substantial and varying force tending to rotate the cam into a position in which the end of its least radius is in contact with the roller and, if such rotation is to be avoided, substantial friction must be present. Moreover the spring applies considerable force, which increases as the spring elongation increases, on the bearings carrying the shaft 3. These defects are particularly serious in cam and follower devices for the precision tuning of electronic apparatus such as certain signal generators, in which a linearly movable tuning element is required to be moved into, and maintain, a precise tuning position by rotating the cam shaft to bring the cam into a corresponding position. It is the object of the present invention to provide improved rotary cam and spring loaded follower devices in which the above defects are reduced or eliminated, and which shall be well suited for use for precision tuning of electronic apparatus.

According to this invention a rotary cam and follower mechanism includes a spring which presses the follower upon the cam and extends between the point at which it applies force to the follower and a movable anchorage which is moved by the cam during rotation thereof in such manner that, as the cam is moved in the direction to increase the cam radius at the point of contact with the follower, the spring force is progressively reduced in relation to that which would obtain if the movable anchorage were replaced by a fixed one.

Preferably the drive from the cam to the movable anchorage is so arranged as to maintain the spring strain substantially constant during cam rotation.

In a preferred embodiment the spring extends between a member fixed in relation to the follower and one end of a wire or cord which is attached at the other to a drum which moves with the cam so that as the cam rotates, the cord is wound on to or unwound from the drum so as to move the movable anchorage.

Preferably the drum is concentric with the cam shaft, and the drum diameter and the point of attachment of the wire or cord with the drum are so chosen that, during cam rotation, the spring strain remains substantially constant. If the cam is one in which the radius under the follower increases linearly with angular rotation, constant spring strain may be obtained by using a cylindrical drum concentric with the cam shaft but, obviously, for other shapes of cam substantial constancy of spring strain can be obtained by using other shapes of drum and/or by mounting the drum eccentrically with respect to the cam shaft.

A precision electronic circuit tuning device in accordance with this invention could comprise a cam and follower mechanism as above set forth with a linearly movable tuning member driven by the follower and a tuning handle arranged to rotate the cam. In such a device there is preferably provided a main or coarse reading scale attached to the cam and a fine reading auxiliary scale driven by the cam at a higher rotational speed.

Referring to FIGURE 2, in which like references denote like parts in FIGURE 1, a drum 8 is mounted coaxially with the cam 1 and rotates therewith. A flexible elongated element, as shown, a length of wire 9 is attached at one end to the periphery of the drum 8 and the other to one end of a helical spring 6 the other end of which is attached to the peg 7. The arrangement is, as will be seen, such that as the cam 1 rotates in the direction of the arrow and the follower moves away from the cam shaft, the wire 9 unwinds from the drum 8. The effective diameter of the drum 8 is so chosen that the length of wire 9 which is unwound from the drum is approximately equal to the distance moved by the follower. Thus the force urging the follower towards the cam is prevented from increasing in proportion to the movement of the follower away from the cam axis. In the illustrated construction, the spring force is maintained approximately constant. Preferably when the follower is at its nearest to the cam shaft there is about one turn of wire on the drum.

The rotary cam and spring loaded follower device provided by the present invention is particularly suitable for use in the precision tuning of electronic equipment in which the movement of a linearly moving tuning member driven by the shaft 4 adjusts an electrical frequency. FIGURE 2 shows schematically the coil 10 of such a precision electronic circuit tuning device and a tuning member 11 movable linearly therein. The tuning device also includes an actuating lever element 12 having a fixed pivot 13 and pivoted connections 14 and 15 to the cam follower and the member 11 respectively. The cam may be rotated from the tuning knob via a reduction gear and, by suitably choosing the profile of the cam a linear relation (or a desirably close approximation thereto) between rotation of the cam and the change in electrical frequency is readily obtainable. A main scale is attached to the cam and an auxiliary fine reading scale is arranged to be driven therewith at a multiple of its angular speed. Such tuning arrangements in accordance with this invention lend themselves to precision tuning with required tuning positions accurately obtainable. Moreover because of the great reduction of the tendency of the follower to rotate the cam away from positions in which the follower is furthest from the cam shaft, necessary friction to maintain adjusted positions is reduced to a minimum

I claim:

1. A rotary cam and follower mechanism comprising a rotatable cam having a profile of varying radius; a movable cam follower engaging said cam profile and being movable by said cam during rotation of said cam; a spring connected at one of its ends to said follower; and a movable anchorage to which said spring is connected at the other of its ends, whereby said spring maintains said follower in contact with said cam profile, said anchorage being connected to said cam and being movable in response to rotation of said cam for preventing increase in the spring force in proportion to movement of said follower by said cam.

2. A rotary cam and follower mechanism according to claim 1 in which the contour of the cam profile is so related to the movement of said spring anchorage caused by rotation of said cam as to maintain the force of said spring substantially constant.

3. A rotary cam and follower mechanism according to claim 1 in which said spring anchorage comprises a drum rotatable in response to rotation of said cam, and in which the connection between said other of said spring ends and said anchorage includes an elongated flexible element wound around said drum.

4. A rotary cam and follower mechanism according to claim 3 in which said drum and said cam are rotatable about a common axis.

5. A rotary cam and follower mechanism according to claim 4 in which said drum is fixed to said cam.

6. A rotary cam and follower mechanism according to claim 5 in which said cam profile is such that the cam radius at the point of contact with said follower increases linearly with the cam rotation in said one direction, and in which said drum is cylindrical.

7. The combination of a precision electronic circuit tuning device actuating element; and a rotary cam and follower mechanism for operating said actuating element, said mechanism comprising a rotatable cam having a profile of varying radius; a movable cam follower operatively connected to said actuating element and engaging said cam profile and being movable by said cam during rotation of said cam; a spring connected at one of its ends to said follower; and a movable anchorage to which said spring is connected at the other of its ends, whereby said spring maintains said follower in contact with said cam profile, said anchorage being connected to said cam and being movable in response to rotation of said cam for preventing increase in the spring force in proportion to movement of said follower by said cam.

References Cited

UNITED STATES PATENTS 1,711,931  5/1929  Farrington _____ 74—10.6 X

MILTON KAUFMAN, *Primary Examiner.*

U.S. Cl. X.R.

74—55, 107, 569